(12) United States Patent
Cordeiro et al.

(10) Patent No.: US 10,250,355 B2
(45) Date of Patent: Apr. 2, 2019

(54) APPARATUS, SYSTEM AND METHOD OF MULTI-USER WIRELESS COMMUNICATION

(71) Applicant: Intel IP Corporation, Santa Clara, CA (US)

(72) Inventors: Carlos Cordeiro, Portland, OR (US); Assaf Kasher, Haifa (IL); Chittabrata Chitto Ghosh, Fremont, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/960,102

(22) Filed: Apr. 23, 2018

(65) Prior Publication Data

US 2018/0248648 A1 Aug. 30, 2018

Related U.S. Application Data

(63) Continuation of application No. 15/584,158, filed on May 2, 2017, now Pat. No. 9,985,740, which is a continuation of application No. 14/749,848, filed on Jun. 25, 2015, now Pat. No. 9,749,087.

(60) Provisional application No. 62/154,902, filed on Apr. 30, 2015.

(51) Int. Cl.
*H04L 1/00* (2006.01)

(52) U.S. Cl.
CPC .......... *H04L 1/0003* (2013.01); *H04L 1/0009* (2013.01); *H04L 1/0025* (2013.01)

(58) Field of Classification Search
CPC .... H04L 1/0003; H04L 1/0009; H04L 1/0025
See application file for complete search history.

(56) References Cited

U.S. PATENT DOCUMENTS

| | | | |
|---|---|---|---|
| 2009/0046681 A1 | 2/2009 | Kalogridis et al. | |
| 2010/0091919 A1 | 4/2010 | Xu et al. | |
| 2012/0155415 A1* | 6/2012 | Seok | H04L 1/0003 370/329 |
| 2012/0257567 A1* | 10/2012 | Abraham | H04B 7/0626 370/328 |
| 2013/0100994 A1* | 4/2013 | Merlin | H04L 1/0003 375/219 |
| 2013/0208715 A1* | 8/2013 | Roh | H04L 1/0025 370/338 |
| 2014/0169195 A1* | 6/2014 | Hsin | H04W 24/06 370/252 |

(Continued)

OTHER PUBLICATIONS

Extended European Search Report for Application No. EP16786882.7, dated Dec. 17, 2018, 12 pages.

*Primary Examiner* — Kevin D Mew
(74) *Attorney, Agent, or Firm* — Alliance IP, LLC

(57) ABSTRACT

Some demonstrative embodiments include apparatuses, devices, systems and methods of multi-user (MU) wireless communication. For example, a wireless station may generate a MU Physical Layer Convergence Protocol (PLCP) Protocol Data Unit (PPDU) including a header field and a plurality of Spatial Streams (SSs) of Media Access Control (MAC) Protocol Data Units (MPDUs) to a plurality of users, the header field including an indication of a plurality of modulation schemes corresponding to respective ones of the plurality of users; and process transmission of the MU PPDU to the plurality of users over a wireless communication band.

16 Claims, 7 Drawing Sheets

(56) References Cited

U.S. PATENT DOCUMENTS

| | | | |
|---|---|---|---|
| 2014/0348097 A1* | 11/2014 | Park | H04L 25/0226 370/329 |
| 2015/0124786 A1* | 5/2015 | Asterjadhi | H04W 28/18 370/336 |
| 2015/0264161 A1* | 9/2015 | Tian | H04L 69/22 370/338 |
| 2015/0282186 A1* | 10/2015 | Trainin | H04W 74/0816 370/336 |

* cited by examiner

APPARATUS, SYSTEM AND METHOD OF MULTI-USER WIRELESS COMMUNICATION

CROSS REFERENCE

This application is a continuation of U.S. application Ser. No. 15/584,158, filed May 2, 2017, entitled "Apparatus, System and Method of Multi-User Wireless Communication", which is a continuation of U.S. application Ser. No. 14/749,848, filed Jun. 25, 2015 entitled "Apparatus, System and Method of Multi-User Wireless Communication", which claims the benefit of and priority from US Provisional Patent Application No. 62/154,902 entitled "Apparatus, System and Method of Multi-User Wireless Communication", filed Apr. 30, 2015, the entire disclosures of which are incorporated herein by reference.

TECHNICAL FIELD

Embodiments described herein generally relate to multi-user (MU) wireless communication.

BACKGROUND

A wireless communication network in a millimeter-wave band may provide high-speed data access for users of wireless communication devices.

According to some Specifications and/or Protocols, devices may be configured to perform all transmissions and receptions over a single channel bandwidth (BW).

Some Specifications, e.g., an IEEE 802.11ad Specification, may be configured to support a Single User (SU) system, in which a Station (STA) cannot transmit frames to more than a single STA at a time.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
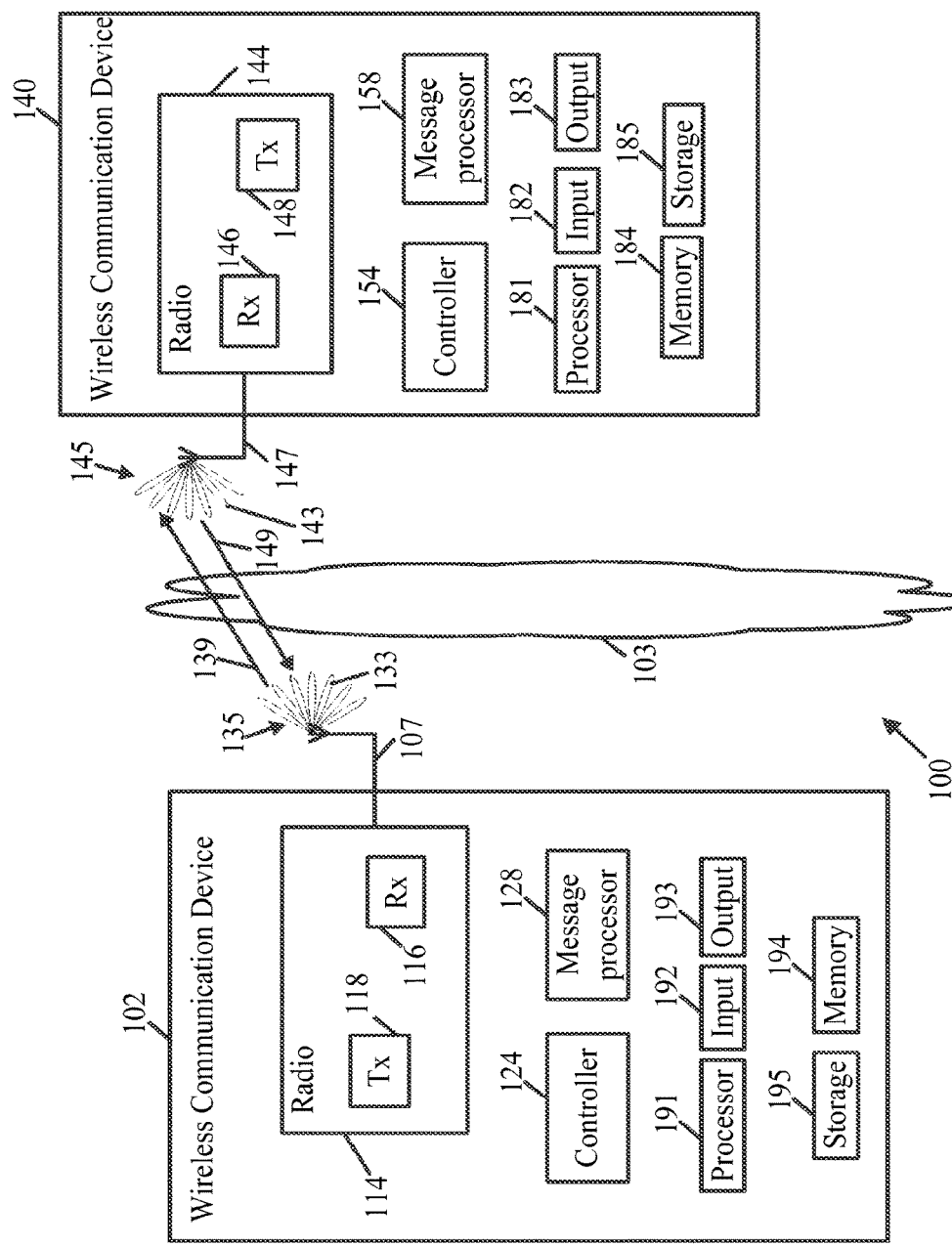
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, an Internet of Things (IoT) device, a sensor device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical*

Layer (PHY) Specifications, Mar. 29, 2012; IEEE802.11ac-2013 ("*IEEE P802.11ac-2013, IEEE Standard for Information Technology—Telecommunications and Information Exchange Between Systems—Local and Metropolitan Area Networks*—Specific Requirements—Part 11: Wireless LAN Medium Access Control (MAC) and Physical Layer (PHY) Specifications—Amendment 4: Enhancements for Very High Throughput for Operation in Bands below 6 GHz", Dec., 2013); IEEE 802.11ad ("*IEEE P802.11ad-2012, IEEE Standard for Information Technology—Telecommunications and Information Exchange Between Systems—Local and Metropolitan Area Networks*—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); *IEEE-802.11REVmc* ("*IEEE 802.11-REVmc™/D3.0, Jun. 2014 draft standard for Information technology—Telecommunications and information exchange between systems Local and metropolitan area networks Specific requirements*; Part 11: Wireless LAN Medium Access Control (MAC) and Physical Layer (PHY Specification"); IEEE802.11-*ay* (*P802.11ay Standard for Information Technology—Telecommunications and Information Exchange Between Systems Local and Metropolitan Area Networks —Specific Requirements Part* 11: Wireless LAN Medium Access Control (MAC) and Physical Layer (PHY) Specifications—Amendment: Enhanced Throughput for Operation in License-Exempt Bands Above 45 GHz)) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version 1.1, Apr. 2011, Final specification*) and/or future versions and/or derivatives thereof, devices and/or networks operating in accordance with existing Wireless Fidelity (WiFi) Alliance (WFA) Peer-to-Peer (P2P) specifications (including "*WiFi Peer-to-Peer (P2P) technical specification, version* 1.5, *Aug.* 4, 2014") and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (S1G) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, a wireless communication device 115, and/or one more other devices.

In some demonstrative embodiments, devices 102, 115, and/or 140 may include a mobile device or a non-mobile, e.g., a static, device.

For example, devices 102, 115, and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or devices 115 and/or 140 may include, for example, one or more of a processor 181, an input unit 182, an output unit 183, a memory unit 184, and/or a storage unit 185. Devices 102, 115, and/or 140 may optionally include other suitable hardware components and/or software components. In some demonstrative embodiments, some or all of the components of one or more of devices 102, 115, and/or 140 may be enclosed in a common housing or packaging, and may be interconnected or operably associated using one or more wired or wireless links. In other embodiments, components of one or more of devices 102, 115 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102, 115, and/or 140 may be capable of communicating content, data, information and/or signals via a wireless medium (WM) 103. In some demonstrative embodiments, wireless medium 103 may include, for example, a radio channel, a cellular channel, an RF channel, a Wireless Fidelity (WiFi) channel, an IR channel, a Bluetooth (BT) channel, a Global Navigation Satellite System (GNSS) Channel, and the like.

In some demonstrative embodiments, WM 103 may include a directional channel. For example, WM 103 may include a millimeter-wave (mmWave) wireless communication channel.

In some demonstrative embodiments, WM 103 may include a DMG channel. In other embodiments, WM 103 may include any other additional or alternative directional channel.

In other embodiments, WM 103 may include any other type of channel over any other frequency band.

In some demonstrative embodiments, devices 102, 115, and/or 140 may perform the functionality of one or more wireless stations, e.g., as described below.

In some demonstrative embodiments, devices 102, 115, and/or 140 may perform the functionality of one or more DMG stations.

In other embodiments, devices 102, 115, and/or 140 may perform the functionality of any other wireless device and/or station, e.g., a WLAN STA, a WiFi STA, and the like.

In some demonstrative embodiments, devices 102, 115, and/or 140 may include one or more radios including circuitry and/or logic to perform wireless communication between devices 102, 115, 140 and/or one or more other wireless communication devices. For example, device 102 may include a radio 114, and/or devices 115 and/or 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may include circuitry, logic, modulation elements, demodulation elements, amplifiers, analog to digital and digital to analog converters, filters, and/or the like. For example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In other example, device 102 may include two or more antennas 107.

In one example, device 140 and/or device 115 may include a single antenna 147. In another example, device 140 and/or device 115 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include a directional antenna, which may be steered to a plurality of beam directions.

In some demonstrative embodiments, antennas 107 and/or 147 may include a directional antenna, which may be steered to a plurality of beam directions. For example, antenna 107 may be steered to a plurality of beam directions 135, and/or antenna 147 may be steered to a plurality of beam directions 145. For example, device 102 may transmit a directional transmission 139 to device 140, e.g., via a direction 133, and/or device 140 may transmit a directional transmission 149 to device 102, e.g., via a direction 143.

In some demonstrative embodiments, device 102 may include a controller 124, and/or devices 140 and/or 115 may include a controller 154. Controllers 124 and/or 154 may be configured to perform one or more communications, may generate and/or communicate one or more messages and/or transmissions, and/or may perform one or more functionalities, operations and/or procedures between devices 102, 115, and/or 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below. In one example, message processor 128 may be configured to process transmission of one or more messages from a wireless station, e.g., a wireless STA implemented by device 102; and/or message processor 128 may be configured to process reception of one or more messages by a wireless station, e.g., a wireless STA implemented by device 102.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below. In one example, message processor 158 may be configured to process transmission of one or more messages from a wireless station, e.g., a wireless STA implemented by device 140; and/or message processor 158 may be configured to process reception of one or more messages by a wireless station, e.g., a wireless STA implemented by device 140.

In some demonstrative embodiments, message processors 128 and/or 158 may include circuitry, e.g., processor circuitry, memory circuitry, Media-Access Control (MAC) circuitry, Physical Layer (PHY) circuitry, and/or any other circuitry, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System in Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a SoC. In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, devices 102, 115, and/or 140 may be configured to perform the functionality of an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, devices 102, 115, and/or 140 may be configured to perform the functionality of a non-AP STA, e.g., a DMG non-AP STA, and/or a non-PCP STA, e.g., a DMG non-PCP STA, for example, a non-AP/PCP STA, e.g., a DMG non-AP/PCP STA.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

Some specifications, e.g., the *IEEE 802.11 ad-2012 Specification*, may be configured to support a Single User (SU) system, in which a Station (STA) cannot transmit frames to more than a single STA at a time. Such specifications may not be able, for example, to support transmission from a STA to multiple STAs, e.g., simultaneously.

In some demonstrative embodiments, devices 102, 140, and/or 115 may be configured to support simultaneous transmission from a STA, e.g., a STA implemented by device 102, to multiple STAs, e.g., including a STA implemented by device 140 and/or a STA implemented by device 115, for example, using a multi-user MIMO (MU-MIMO) scheme, e.g., a downlink (DL) MU-MIMO, and/or any other MU scheme.

In some demonstrative embodiments, devices 102, 115, and/or 140 may be configured to implement one or more Multi-User (MU) mechanisms. For example, devices 102, 115, and/or 140 may be configured to implement one or more MU mechanisms, which may be configured to enable MU communication.

In some demonstrative embodiments, devices 102, 140 and/or 115 may be configured to implement one or more MU mechanisms, which may be configured to enable MU communication of Downlink (DL) frames using a Multiple-Input-Multiple-Output (MIMO) scheme, for example, between a device, e.g., device 102, and a plurality of devices, e.g., including devices 140, 115 and/or one or more other devices, e.g., as described below.

In some demonstrative embodiments, devices 102, 115 and/or 140 may be configured to implement any other additional or alternative MU mechanism, e.g., to communicate MU transmissions, and/or any other MIMO mechanism, e.g., to communicate MIMO transmissions.

In some demonstrative embodiments, devices 102, 115, and/or 140 may be configured to communicate over a Next Generation 60 GHz (NG60) network, an Extended DMG (EDMG) network, and/or any other network and/or any other frequency band. For example, devices 102, 115, and/or 140 may be configured to communicate DL MU-MIMO transmissions and/or use channel bonding, for example, for communicating over the NG60 and/or EDMG networks.

Figure 2:
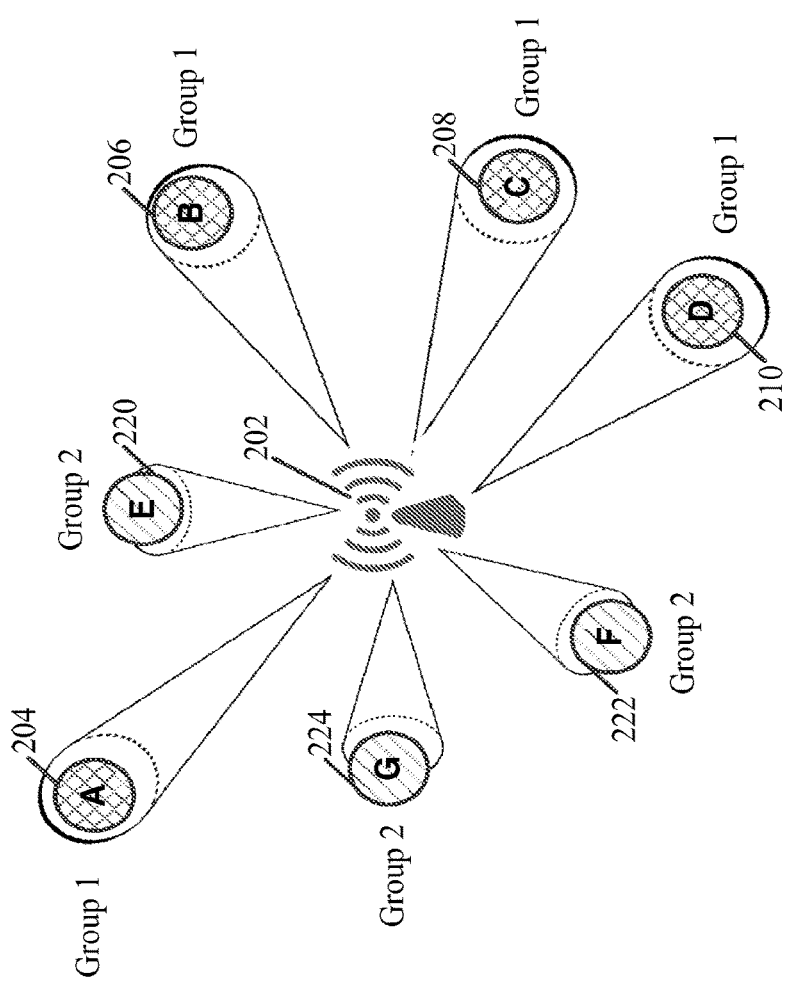
FIG. 2 is a schematic illustration of a Multi-User (MU) scheme including two groups of Stations (STAs), in accordance with some demonstrative embodiments.

FIG. 2 is a schematic illustration of a Multi-User (MU) scheme including two groups of Stations (STAs), in accordance with some demonstrative embodiments.

For example, as shown in FIG. 2, a STA 202 may be configured to communicate with a first group, denoted group 1, which may include four STAs, e.g., a STA A 204, a STA B 206, a STA C 208, and a STA D 210; and/or a second group, denoted group 2, which may include three STAs, e.g., a STA E 220, a STA F 222, and a STA G 224.

In one example, device 102 (FIG. 1) may perform the functionality of STA 202, device 115 (FIG. 1) may perform the functionality of one of STAs 204, 206, 208, 210, 220, 222, and/or 224, and/or device 140 (FIG. 1) may perform the functionality of another one of STAs 204, 206, 208, 210, 220, 222, and/or 224.

Referring back to FIG. 1, some specifications may be configured to support communications over a single channel bandwidth (BW) of a wireless communication band, for example, a DMG band or any other band. For example, the *IEEE 802.11ad Specification* defines a 60 GHz system with a single channel bandwidth (BW) of 2.16 GHz, which is to be used by all Stations (STAs) for both transmission and reception.

In some demonstrative embodiments, devices 102, 115, and/or 140 may be configured to implement one or more mechanisms, which may, for example, enable to extend a single-channel BW scheme, e.g., a scheme in accordance with the *IEEE 802.11ad Specification* or any other scheme, for higher data rates and/or increased capabilities, e.g., as described below.

In some demonstrative embodiments, devices 102, 115, and/or 140 may be configured to implement one or more channel bonding mechanisms, which may, for example, support communication over bonded channels.

In some demonstrative embodiments, the channel bonding may include, for example, a mechanism and/or an operation whereby two or more channels can be combined, e.g., for a higher bandwidth of packet transmission, for example, to enable achieving higher data rates, for example, compared to transmissions over a non-bonded channel, e.g., a single channel.

In some demonstrative embodiments, devices 102, 115 and/or 140 may be configured to implement one or more channel bonding mechanisms, which may for example, support an increased channel bandwidth, for example, a channel BW of 4.32 GHz, a channel BW of 6.48 GHz, and/or any other additional or alternative channel BW.

In some demonstrative embodiments, devices 102, 115 and/or 140 may be configured to communicate according to a non-overlapping channel bonding scheme, e.g., as described below.

Figure 3:
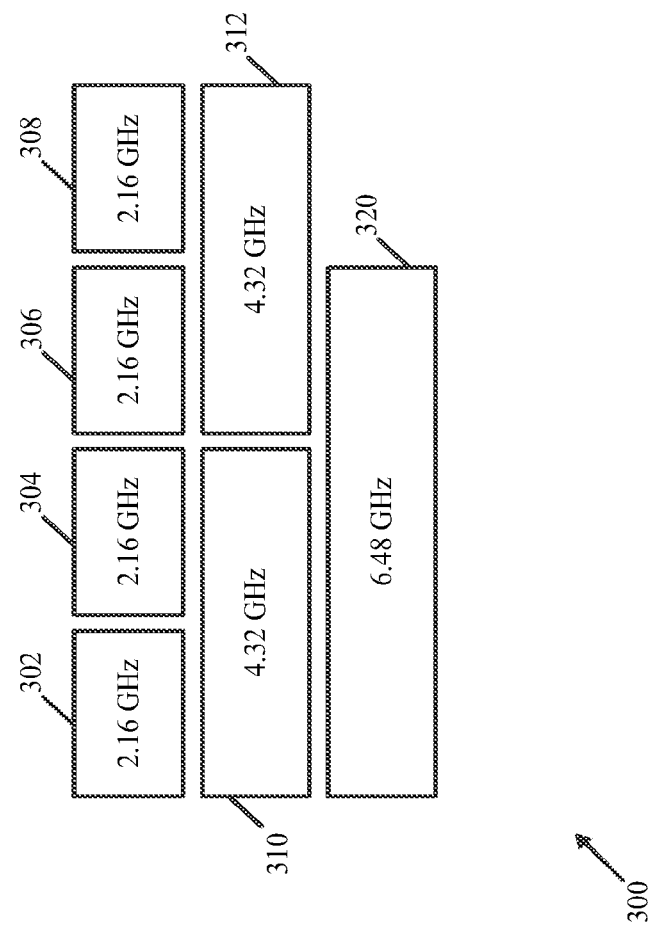
FIG. 3 is a schematic illustration of channel bonding scheme, in accordance with some demonstrative embodiments.

FIG. 3 is a schematic illustration of channel bonding scheme 300, in accordance with some demonstrative embodiments.

In some demonstrative embodiments, controller 124 (FIG. 1) may be configured to cause a STA implemented by device 102 (FIG. 1) to process transmission over a bonded channel including at least two bonded channels, e.g., in accordance with channel bonding scheme 300.

For example, controller 124 (FIG. 1) may be configured to cause message processor 128 (FIG. 1) to generate a transmission to be transmitted over the bonded channel, and/or radio 114 (FIG. 1) to perform the transmission over the bonded channel, e.g., as described below.

In some demonstrative embodiments, controller 154 (FIG. 1) may be configured to cause a STA implemented by device 140 (FIG. 1) to process reception of a transmission over a bonded channel including at least two bonded channels, e.g., in accordance with channel bonding scheme 300.

For example, controller 154 (FIG. 1) may be configured to cause radio 144 (FIG. 1) to receive the transmission over the bonded channel, and/or message processor 158 (FIG. 1) to process the transmission received over the bonded channel, e.g., as described below.

In some demonstrative embodiments, as shown in FIG. 3, channel bonding scheme 300 may be configured to bond between two or more of four non-overlapping 2.16 GHz channels, for example, a 2.16 GHz channel 302, a 2.16 GHz channel 304, a 2.16 GHz channel 306, and a 2.16 GHz channel 308.

For example, the 2.16 GHz channels 302, 304, 306 and/or 308 may be defined in accordance with an *IEEE 802.11 Specification, e.g., the IEEE 802.11ad Specification.*

Some demonstrative embodiments are described herein with respect to a channel binding scheme, e.g., channel bonding scheme 300, configured with respect to four non-overlapping 2.16 GHz channels, e.g., channels 302, 304, 306 and/or 308. However, in other embodiments the channel bonding scheme may be configured with respect to any other number of channels, e.g., more than four channels or less than four channels, and/or channels having any other bandwidth, e.g., channels narrower than 2.16 GHz or wider than 2.16 GHz.

In some demonstrative embodiments, channel-bonding scheme 300 may include one or more bonded channels, which may include two 2.16 GHz channels. For example, as shown in FIG. 3, channel bonding scheme 300 may include a bonded channel 310 having a bandwidth of 4.32 GHz, e.g., including and/or formed by a bonding of channels 302 and 304; and/or a bonded channel 312 having a bandwidth of 4.32 GHz, e.g., including and/or formed by a bonding of channels 306 and 308.

In some demonstrative embodiments, as shown in FIG. 3, channel-bonding scheme 300 may not utilize one or more other combinations of two of channels 302, 304, 306 and 308. For example, channel-bonding scheme 300 may not utilize a channel bonding of channels 304 and 306 to operate on a 4.32 GHz channel, and/or a channel bonding of channels 302 and 308 to operate on a 4.32 GHz channel. In other embodiments, the channel-bonding scheme may utilize one or more of these combinations.

In some demonstrative embodiments, channel-bonding scheme 300 may include one or more bonded channels, which may include three 2.16 GHz channels. For example, as shown in FIG. 3, channel-bonding scheme 300 may include a bonded channel 320 having a bandwidth of 6.48 GHz, e.g., including and/or formed by a bonding of channels 302, 304 and 306. Additionally or alternatively, channel-bonding scheme 300 may include a bonded channel (not shown in FIG. 3) having a bandwidth of 6.48 GHz, e.g., including and/or formed by a bonding of channels 304, 306 and 308.

In some demonstrative embodiments, as shown in FIG. 3, channel-bonding scheme 300 may not utilize one or more other combinations of three of channels 302, 304, 306 and 308. For example, channel-bonding scheme 300 may not utilize a channel bonding of channels 302, 304 and 308 to operate on a 6.48 GHz channel; and/or a channel bonding of channels 302, 306 and 308 to operate on a 6.48 GHz channel. In other embodiments, the channel-bonding scheme may utilize one or more of these combinations.

Referring back to FIG. 1, in some demonstrative embodiments, devices 102, 140 and/or 115 may be configured according to a communication scheme, which may include changes to an *IEEE 802.11 Specification*, e.g., the *IEEE 802.11ad-2012 Specification*, for example, at least in a Physical layer (PHY) and/or a Media Access Control (MAC) layer, for example, to support MU capabilities. For example, a PHY header, a Physical Layer Convergence Protocol (PLCP) Protocol Data Unit (PPDU) format and/or MU MIMO signaling may be configured to enable the MU communications, e.g., as described below.

In some demonstrative embodiments, devices 102, 140 and/or 115 may be configured according to a communication scheme, which include a Physical layer (PHY) and/or a Media Access Control (MAC) layer, for example, to support MU capabilities. For example, the communication scheme may include a PHY header, a Physical Layer Convergence Protocol (PLCP) Protocol Data Unit (PPDU) format and/or MU MIMO signaling, which may be configured to enable the MU communications, e.g., as described below.

In some demonstrative embodiments, the communication scheme may be based on, or may include, for example, changes to an *IEEE 802.11 Specification*, e.g., the *IEEE 802.11ad-2012 Specification*. In other embodiments, the communication scheme may be based on, or may include changes to any other Specification or protocol. In other embodiments, the communication scheme may include a new and/or dedicated scheme.

In some demonstrative embodiments, devices 102, 140 and/or 115 may be configured to utilize a MU PPDU structure, which may be configured, for example, at least for MU directional communication, for example, over a DMG band, e.g., as described below.

In some demonstrative embodiments, the MU PPDU structure may be configured to provide, for example, at least modulation information ("modulation signaling" or "modulation indication") to indicate one or more modulation schemes to be used for MU transmission, e.g., as described below.

For example, different modulation schemes may be used to communicate data with different STAs. In one example, a first modulation scheme, e.g., an OFDM scheme, may be used, e.g., by STA 202 (FIG. 2), to communicate data with one or more STAs of FIG. 2, while a second modulation scheme, e.g., a Single Carrier (SC) scheme, may be used, e.g., by STA 202 (FIG. 2), to communicate data with one or more other STAs of FIG. 2.

In some demonstrative embodiments, the MU PPDU structure may be configured to provide the modulation signaling, e.g., OFDM versus SC signaling, for example, to be used by EDMG devices or stations, NG60 devices or stations, *IEEE 802.11ay* devices or stations, and/or any other devices or stations.

In some demonstrative embodiments, the MU PPDU structure may be configured to provide the indication of the one or more modulation schemes, for example, to be available to one or more receiver stations, for example, earlier in a packet decoding process, for example, to enable an appropriate decoding chain to be used by the receiver stations, e.g., based on the modulation scheme.

In some demonstrative embodiments, the modulation signaling may be different from a Modulation and Coding Scheme (MCS) indication, e.g., Binary Phase Shift Keying (BPSK), Quadrature Phase Shift Keying (QPSK), Quadrature Amplitude Modulation (QAM), which may not be required by a receiving station at this decoding stage.

In some demonstrative embodiments, it may be advantageous to provide the modulation signaling to the receiver device in advance, for example, even before the MCS is provided to the receiver device, e.g., due to one or more implementation differences between a SC receiver and an OFDM receiver. For example, a pipelining process used for OFDM processing may require knowledge of the modulation signaling, for example, even before the MCS is known.

In some demonstrative embodiments, the MU PPDU structure may be configured to include the modulation signaling information as part of a header of the MU PPDU, e.g., as described below.

In some demonstrative embodiments, the MU PPDU structure may be configured to include the modulation signaling information as part of a non-legacy header of the MU PPDU, e.g., as described below.

In some demonstrative embodiments, the MU PPDU structure may be configured to include the modulation signaling information as part of a first non-legacy header of the MU PPDU, e.g., as described below.

In some demonstrative embodiments, the MU PPDU structure may be configured to include the MCS information as part of a second non-legacy header of the MU PPDU, e.g., as described below.

Some communication protocols and/or standards, for example, for low frequency bands, e.g., the *IEEE 802.1111ac-203 Specification*, the *IEEE 802.11n-2009 Specification*, and/or LTE Specifications, may be configured to use well-defined modulations. Accordingly, these specifications may not be configured to address the aspect of modulation signaling, e.g., as described herein.

Some specifications, for example, the *IEEE 802.11ad-2012 Specification*, may support OFDM and SC modulations, which may be indicated through a channel estimation sequence. However, the *IEEE 802.11ad Specification* is directed to a single user system.

In some demonstrative embodiments, the MU PPDU structure may be configured to support communication in a MU MIMO system, for example, to support transmission of a plurality of different Spatial Streams (SSs) from a wireless station, e.g., a STA implemented by device 102, to a plurality of different users, e.g., including STAs implemented by device 140, device 115 and/or any other device, in the same frame, e.g., as described below.

In some demonstrative embodiments, the MU PPDU structure may be configured to provide a separate modulation signaling, for example, per SS and/or per user, e.g., as described below.

Figure 4:
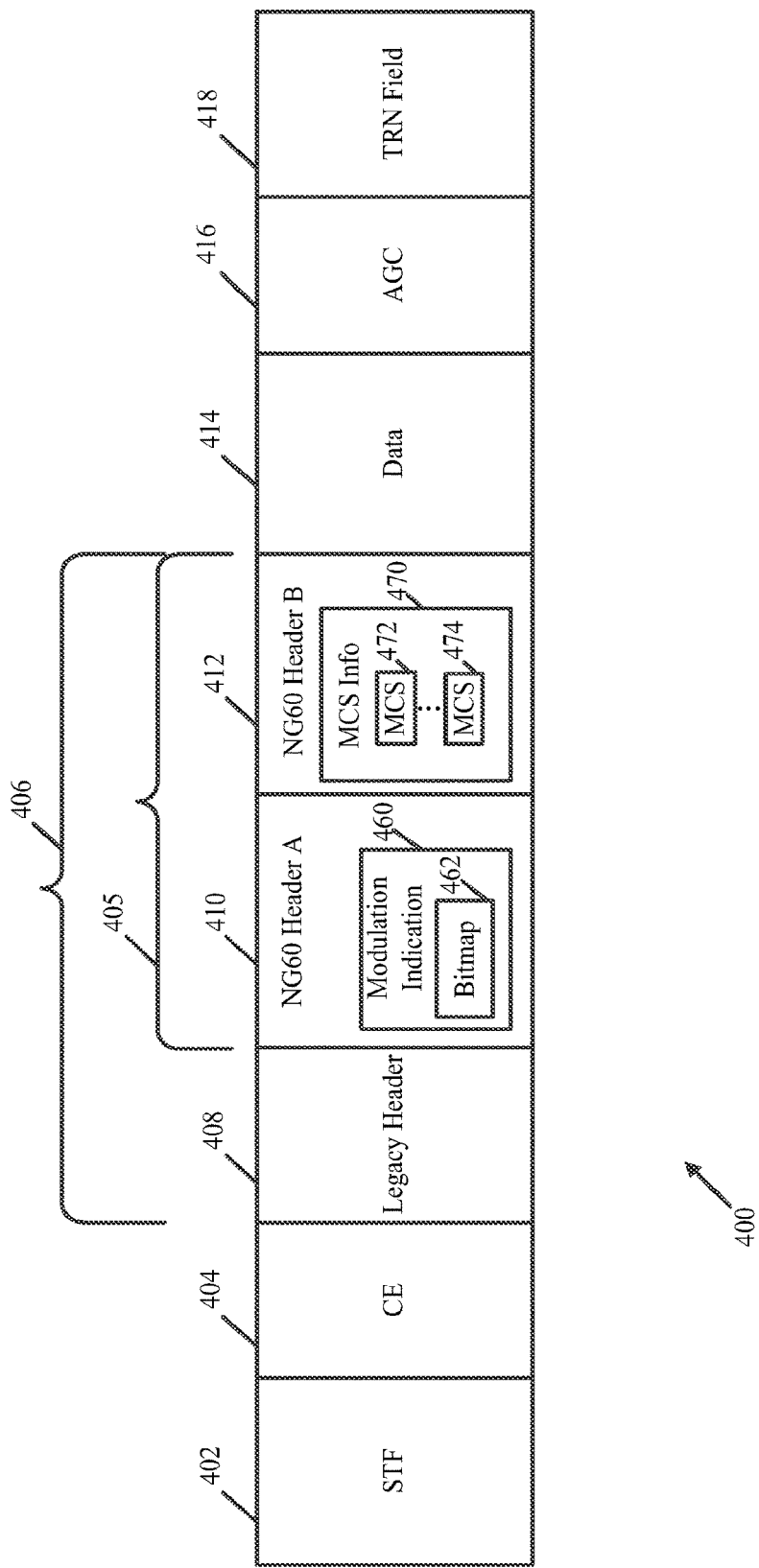
FIG. 4 is a schematic illustration of a Physical Layer Convergence Protocol (PLCP) Protocol Data Unit (PPDU) structure, in accordance with some demonstrative embodiments.

Reference is made to FIG. 4, which schematically illustrates a Physical Layer Convergence Protocol (PLCP) Protocol Data Unit (PPDU) structure 400, in accordance with some demonstrative embodiments.

In some demonstrative embodiments, PPDU structure 400 may be configured, for example, to support communication according to a MU MIMO configuration, for example, over a directional band, e.g., as described below.

In some demonstrative embodiments, device 102 (FIG. 1), device 115 (FIG. 1), and/or device 140 (FIG. 1) may be configured to process transmission and/or reception of the PPDU structure 400. For example, device 102 (FIG. 1) may be configured to generate and transmit a frame, e.g., a MU PPDU, having the PPDU structure 400, and/or devices 115 and/or 140 (FIG. 1) may be configured to process reception of a frame, e.g., a MU PPDU, having the PPDU structure 400, e.g., as described below.

In some demonstrative embodiments, as shown in FIG. 4, PPDU 400 may include a Short Training Field (STF) 402, a channel estimation (CE) field 404, a header portion 406, a data portion 414, an Automatic Gain Control (AGC) field 416, and/or a Training (TRN) field 418.

In some demonstrative embodiments, header portion 406 may include a PHY header portion.

In some demonstrative embodiments, header portion 406 may include a PLCP header portion, e.g., of a PPDU including the fields of frame structure 400.

In some demonstrative embodiments, a header structure of header portion 406 may be configured to support NG60 and/or EDMG communication, and/or any other type and/or form of communication, e.g., as described below.

In some demonstrative embodiments, as shown in FIG. 4, header portion 406 may include legacy header (L-Header) 408.

In some demonstrative embodiments, legacy header 408 may include a header, which may have a structure in accordance with a current, legacy and/or conventional header.

In some demonstrative embodiments, legacy header 408 may have a structure, which may be processed, decoded and/or demodulated by one or more legacy, existing and/or conventional, e.g., devices which may currently be in the market.

In some demonstrative embodiments, legacy header 408 may have a structure, which may be in accordance with a PHY header structure of an *IEEE* 802.11 *Specification*, for example, the *IEEE* 802.11*ad*-2012 *Specification*, and/or any other Specification, protocol or Standard.

In some demonstrative embodiments, legacy header 408 may include a Single Carrier (SC) header. In other embodiments, legacy header 408 may include an OFDM header, and/or any other header.

In some demonstrative embodiments, header portion 406 may be configured to include a non-legacy information header 405, which may be included as part of a PLCP header of PPDU 400, e.g., as described below In some demonstrative embodiments, non-legacy header 405 may include a first non-legacy header 410, denoted "NG60 Header A" or "EDMG Header A", e.g., as described below.

In some demonstrative embodiments, non-legacy header 405 may include a second non-legacy header 412, denoted "NG60 Header B" or "EDMG Header B".

In other embodiments, non-legacy headers 410 and 412, may be combined into a single header 405 and/or may be divided into more than two headers.

In some demonstrative embodiments, non-legacy headers 410 and 412 may differ from each other, for example, at least with respect to where in the PPDU structure 400 non-legacy headers 410 and/or 412 may be included; and/or with respect to the contents, functionality, intent, and/or purpose of non-legacy headers 410 and/or 412.

In some demonstrative embodiments, as shown in FIG. 4, non-legacy header 410 may be included, for example, immediately after the legacy header 408.

In some demonstrative embodiments, non-legacy header 410 may be configured, for example, to include information pertaining to, and/or to be used by, both single user (SU) transmissions of a SU PPDU, and MU transmissions of a MU PPDU, e.g., as described below.

In some demonstrative embodiments, non-legacy header 412 may be configured, for example, to include information pertaining to, and/or to be used by, MU transmissions, e.g., as described below. In one example, non-legacy header 412 may optionally be excluded from structure 400, for example, in a SU transmission.

In some demonstrative embodiments, non-legacy header 412 may be included, for example, on a per SS basis, e.g., as described below.

In some demonstrative embodiments, non-legacy header 410 may include, for example, information of a number of channels to be bonded, e.g., to transmit at least data portion 414; a length of the PPDU, e.g., a length of at least data portion 414 and/or one or more elements of frame 400; a Cyclic Prefix (CP) interval; a number of spatial streams, e.g., to transmit at least data portion 414 to one or more users; and/or any other additional or alternative information.

In some demonstrative embodiments, non-legacy header 412 may include, for example, MU-MIMO parameters, for example, information relating to Spatial Streams (SS), beamforming variables, training sequences, e.g., to be applied to at least data portion 414, and/or any other additional or alternative information.

In some demonstrative embodiments, at least some of the information of non-legacy header 412 may be included in non-legacy header 410, for example, in addition to or instead of including the information in non-legacy header 412.

In some demonstrative embodiments, data portion 414 may include a plurality of Spatial Streams (SSs) of MAC Protocol Data Units (MPDUs), e.g., Aggregate MPDUs (A-MPDUs), to a plurality of users, e.g., as described below.

For example, controller 124 (FIG. 1) may be configured to cause a wireless station, e.g., a wireless station implemented by device 102 (FIG. 1), to generate and process transmission of an MU PPDU, e.g., in accordance with the PPDU structure 400, to a plurality of users, e.g., a plurality of stations implemented by devices 140 (FIG. 1), 115 (FIG. 1) and/or one or more other devices. For example, the MU PPDU may include, e.g., in data portion 414, a plurality of spatial streams of MPDUs to the plurality of users, e.g., as described below.

In some demonstrative embodiments, header field 405 may include a modulation indication 460, of a plurality of modulation schemes corresponding to respective ones of the plurality of users, e.g., as described below.

In some demonstrative embodiments, a modulation scheme of the plurality of modulation schemes may include, for example, a Single Carrier (SC) modulation scheme or an Orthogonal Frequency-Division Multiplexing (OFDM) modulation scheme, e.g., as described below. In other embodiments, the modulation scheme may include any other additional or alternative modulation scheme.

In some demonstrative embodiments, controller 124 (FIG. 1) may be configured to cause the wireless station implemented by device 102 (FIG. 1) to modulate one or more MPDUs of a SS to a user according to a modulation scheme indicated by modulation indication 460 with respect to the user, e.g., as described below.

In some demonstrative embodiments, controller 124 (FIG. 1) may process a MU PPDU to be transmitted to a plurality of users, for example, including a first user, e.g., a STA implemented by device 140 (FIG. 1), and/or a second user, e.g., a STA implemented by device 115 (FIG. 1).

In some demonstrative embodiments, controller 124 (FIG. 1) may determine to modulate communications to the first user, e.g., the STA implemented by device 140 (FIG. 1), according to a first modulation scheme, and to modulate communications to the second user, e.g., the STA implemented by device 115 (FIG. 1), according to a second modulation scheme.

In one example, the first and second modulation schemes may be different. For example, the first modulation scheme may include a SC modulation scheme, and/or the second modulation scheme may include an OFDM modulation scheme. Alternatively, the first and second modulation schemes may include any other modulation schemes.

In another example, the first and second modulation schemes may include the same modulation scheme. For example, both the first and second modulation schemes may include a SC modulation scheme, an OFDM modulation scheme, or any other modulation scheme.

In some demonstrative embodiments, controller 124 (FIG. 1) may be configured to cause the wireless station implemented by device 102 (FIG. 1) to set modulation indication 460 to indicate that the first modulation scheme is to be used to modulate one or more MPDUs, e.g., of data portion 414, of a SS to the first user; and/or to indicate that the second modulation scheme is to be used to modulate one or more MPDUs, e.g., of data portion 414, of a SS to the second user, e.g., as described below.

In some demonstrative embodiments, modulation indication 460 may include, or may be in the form of, a modulation bitmap field 462, which may include a sequence of a plurality of bits representing respective ones of the plurality of modulation schemes, e.g., as described below.

In some demonstrative embodiments, a bit of the plurality of bits of modulation bitmap field 462 may have a first value, e.g., "0", to indicate a first modulation scheme, e.g., a SC modulation scheme or any other modulation scheme, or a second value, e.g., "1", to indicate a second modulation scheme, e.g., an OFDM modulation scheme or any other modulation scheme.

In some demonstrative embodiments, a size of modulation bitmap field 462 may defined, for example, to be equal to a maximum number of users supported by a system, e.g., system 100 (FIG. 1), or any other size.

In some demonstrative embodiments, a number of SS supported by the system may be higher than the number of users. However, in some embodiments, it may be assumed that SSs addressed to the same user are to use the same modulation scheme. Accordingly, the size of the modulation bitmap field may be determined, for example, based on the number of users to be supported.

In some demonstrative embodiments, modulation bitmap field 462 may include an 8-bit field, for example, able to support up to eight users.

For example, controller 124 (FIG. 1) may be configured to cause the wireless station implemented by device 102 (FIG. 1) to set modulation bitmap 462 to the sequence "10010101", for example, to indicate that one or more SSs to a first user may be modulated according to an OFDM scheme, one or more SSs to a second user may be modulated according to a SC scheme, one or more SSs to a third user may be modulated according to a SC scheme, one or more SSs to a fourth user may be modulated according to an OFDM scheme, one or more SSs to a fifth user may be modulated according to a SC scheme, one or more SSs to a sixth user may be modulated according to an OFDM scheme, one or more SSs to a seventh user may be modulated according to a SC scheme, and one or more SSs to an eighth user may be modulated according to an OFDM scheme, In other embodiments, modulation bitmap field 462 may include any other number of bits, for example, able to support up to any other number of users.

In some demonstrative embodiments, modulation indication 460 may be included in a non-legacy header, e.g., non-legacy header 410, following legacy header field 408.

In some demonstrative embodiments, non-legacy header field 412 may include an indication of a plurality of Modulation and Coding Schemes (MCS) corresponding to the plurality of users.

For example, non-legacy header field 412 may include at least a first MCS value 472 to indicate a first MCS to be applied to transmissions to a first user, and/or a second MCS value 474 to indicate a second MCS to be applied to transmissions to a second user.

In some demonstrative embodiments, controller 124 (FIG. 1) may be configured to cause the wireless station implemented by device 102 (FIG. 1) to modulate and encode one or more MPDUs of a SS to a user according to a MCS indicated non-legacy header 412 with respect to the user.

For example, controller 124 (FIG. 1) may be configured to cause the wireless station implemented by device 102 (FIG. 1) to modulate and encode one or more MPDUs of a SS to the first user according to MCS value 472; and/or to modulate and encode one or more MPDUs of a SS to the second user according to MCS value 474.

In some demonstrative embodiments, controller 124 (FIG. 1) may be configured to cause the wireless station implemented by device 102 (FIG. 1) to process transmission of at least one SS of the plurality of SSs of the MU PPDU over a bonded channel including at least two channels, e.g., bonded channel 310 (FIG. 3), bonded channel 312 (FIG. 3), or bonded channel 320 (FIG. 3), in accordance with channel bonding scheme 300 (FIG. 3).

In some demonstrative embodiments, controller 154 (FIG. 1) may be configured to cause a wireless station, for example, a wireless station implemented by device 140 (FIG. 1), to a header field of MU PPDU, e.g., in accordance with the PPDU structure 400, including a plurality of SSs of MPDUs to a plurality of users. For example, the received MU PPDU may include the MU PPDU transmitted by device 102.

In some demonstrative embodiments, controller 154 (FIG. 1) may be configured to cause the wireless station implemented by device 140 (FIG. 1) to process reception of one or more MPDUs of a SS addressed to the wireless station, for example, based on a modulation scheme corresponding the wireless station, as indicated by modulation indication 460.

In some demonstrative embodiments, controller 154 (FIG. 1) may be configured to cause the wireless station implemented by device 140 (FIG. 1) to process reception of the one or more MPDUs of the SS addressed to the wireless station implemented by device 140 (FIG. 1), for example, based on a modulation scheme indicated by a bit in modulation bitmap field 462 corresponding to the wireless station implemented by device 140 (FIG. 1).

In some demonstrative embodiments, controller 154 (FIG. 1) may be configured to cause the wireless station implemented by device 140 (FIG. 1) to demodulate and decode the one or more MPDUs of the SS addressed to the wireless station implemented by device 140 (FIG. 1), for example, according to a MCS indicated by MCS information 470, e.g., by MCS value 472, respect to the wireless station.

In some demonstrative embodiments, controller 154 (FIG. 1) may be configured to cause the wireless station implemented by device 140 (FIG. 1) to process reception of the one or more the MPDUs of the SS addressed to the wireless station implemented by device 140 (FIG. 1) over a bonded channel including at least two channels, e.g., in accordance with channel bonding scheme 300 (FIG. 3).

Figure 5:
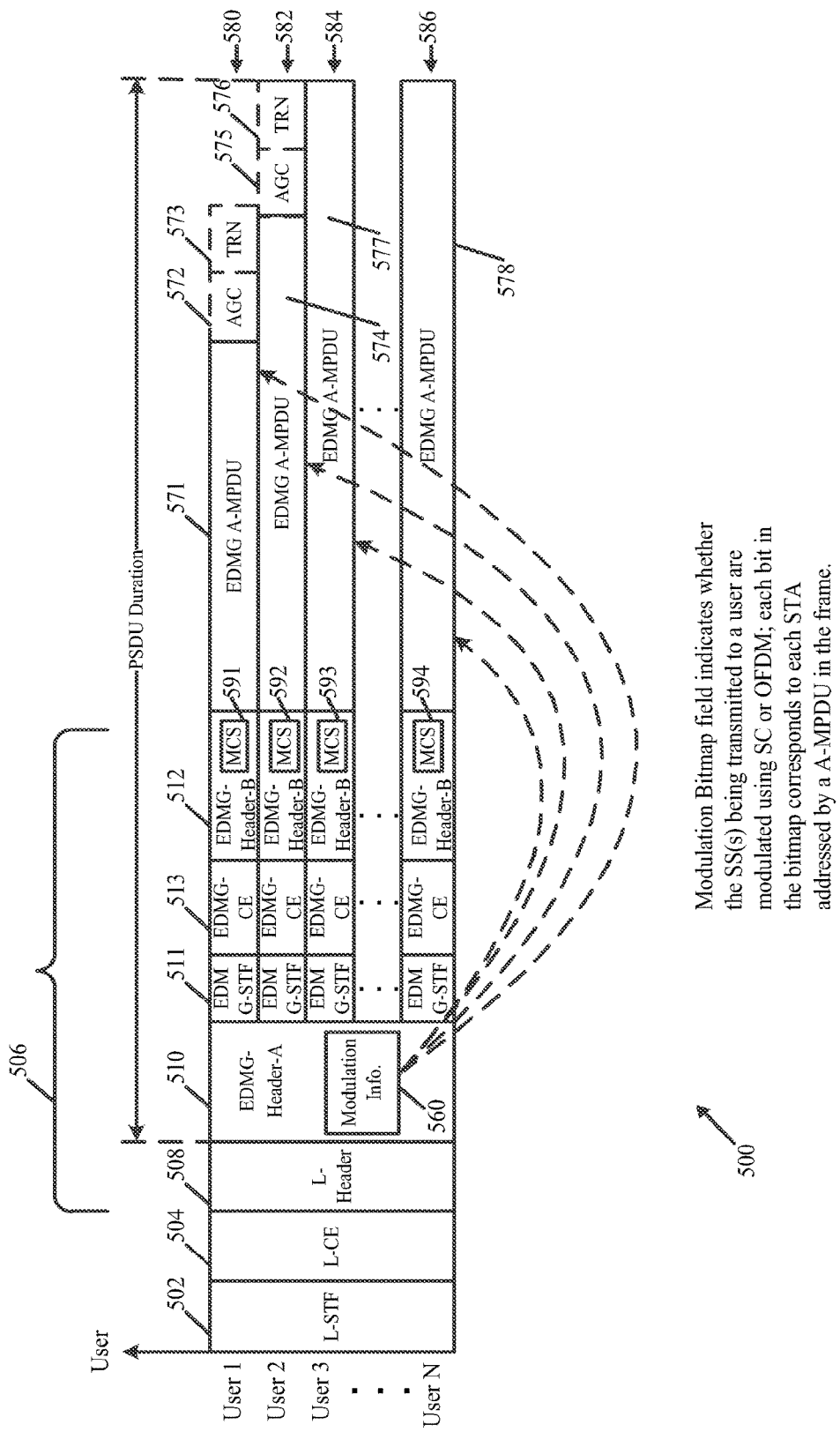
FIG. 5 is a schematic illustration of a Multi User (MU) PPDU structure, in accordance with some demonstrative embodiments.

Reference is made to FIG. 5, which schematically illustrates a MU PPDU structure 500, in accordance with some demonstrative embodiments.

In some demonstrative embodiments, device 102 (FIG. 1), device 115 (FIG. 1), and/or device 140 (FIG. 1) may be configured to process transmission and/or reception of the MU PPDU structure 500. For example, device 102 (FIG. 1) may be configured to generate and transmit a frame having the MU PPDU structure 500, for example, to a plurality of users, e.g., N>1 users, for example, of an MU group, e.g., including devices 115 and/or 140 (FIG. 1); and/or devices 115 and/or 140 (FIG. 1) may be configured to process reception the MU PPDU structure 500, e.g., as described below.

In some demonstrative embodiments, MU PPDU 500 may include a legacy STF (L-STF) 502, a legacy CE (L-CE) field 504, and a header field 506, e.g., as described below. For example, L-STF 502 may include STF 402 (FIG. 4), L-CE 504 may include CE field 404 (FIG. 4), and/or header field 506 may include header 406 (FIG. 4).

In some demonstrative embodiments, header field 506 may include a legacy header (L-Header) 508, a first non-legacy header 510, and a second non-legacy header 512. For example, legacy header 508 may include legacy header 408 (FIG. 4), non-legacy header 510 may include non-legacy header 410 (FIG. 4), and/or non-legacy header 512 may include non-legacy header 412 (FIG. 4).

In some demonstrative embodiments, header field 506 may also include a non-legacy STF 511, e.g., a EDMG-STF or NG60-STF; and/or a non-legacy CE field 513, e.g., an EDMG-CE or NG60 CE.

In some demonstrative embodiments, MU PPDU 500 may include a PHY Service Data Unit (PSDU) including a plurality of Spatial Streams (SSs) to the plurality of users, e.g., as described below.

For example, as shown in FIG. 5, MU PPDU 500 may include an SS 580 to a first user ("user 1"), an SS 582 to a second user ("user 2"), an SS 584 to a third user ("user 3"), and/or an SS 586 to an N-th user ("user N"). In other embodiments, MU PPDU 500 may include any other number of SS to any other number of users.

In some embodiments, SS 580 may include, for example, an A-MPDU 571, e.g., an EDMG A-MPDU or an NG60 A-MPDU, which may be followed for example, by at least one AGC field 572, and/or at least one TRN field 573; SS 582 may include, for example, an A-MPDU 574, e.g., an EDMG A-MPDU or an NG60 A-MPDU, which may be followed for example, by at least one AGC field 575, and/or at least one TRN field 576; SS 584 may include, for example, an A-MPDU 577, e.g., an EDMG A-MPDU or an NG60 A-MPDU; and/or SS 586 may include, for example, an A-MPDU 578, e.g., an EDMG A-MPDU or an NG60 A-MPDU.

In some demonstrative embodiments, MU PPDU 500 may be generated and/or transmitted by a STA implemented by device 102 (FIG. 1); a STA implemented by device 140 (FIG. 1) may perform the functionality of a user of users 1, 2, 3 and/or N; and/or STA implemented by device 115 (FIG. 1) may perform the functionality of another one of users 1, 2, 3 and/or N.

In some demonstrative embodiments, non-legacy header 510 may include information of a number of channels to be bonded, e.g., to communicate SSs 580, 582, 584 and/or 586; a length of the MU PPDU 500; a Cyclic Prefix (CP) interval; a number of spatial streams, e.g., to transmit at least SSs 580, 582, 584 and/or 586; and/or any other additional or alternative information.

In some demonstrative embodiments, field 511, field 513, and/or non-legacy header 512 may include information, for example, on a per SS basis, e.g., as described below.

In some demonstrative embodiments, non-legacy header 512 may include, for example, MU-MIMO parameters, for example, spatial streams, beamforming variables, training sequences, and the like.

For example, as shown in FIG. 5, non-legacy header 512 may indicate first MU-MIMO parameters corresponding to SS 580, second MU-MIMO parameters corresponding to SS 582, third MU-MIMO parameters corresponding to SS 584, and N-th MU-MIMO parameters corresponding to SS 586.

In some demonstrative embodiments, non-legacy header 510 may include modulation signaling information 560 to indicate modulation schemes to be applied to SS 580, SS 582, SS 584, and/or SS 586. For example, modulation signaling information 560 may include modulation signaling information 460 (FIG. 4), e.g., as described above.

In some demonstrative embodiments, modulation signaling information may be, for example, provided in the form of a Modulation Bitmap field, e.g., modulation bitmap field 462 (FIG. 4).

In some demonstrative embodiments, a bit in the modulation bitmap field may correspond to a respective STA addressed by an A-MPDU in MU PPDU 500. For example, the Modulation Bitmap field may a size of at least N bits, e.g., to support the N users.

In some demonstrative embodiments, the bit of the Modulation Bitmap field may be configured indicate for a user whether one or more SSs to the user are to be communicated according to a first modulation scheme, e.g., SC, or a second modulation scheme, e.g., OFDM.

For example, the bit corresponding to the user may be set to a first value, e.g., a value of 0, to indicate that a SC scheme is to be applied to one or more SSs addressed to the user; or to a second value, e.g., a value of 1, to indicate that an OFDM scheme is to be applied to the one or more SSs addressed to the user.

In some demonstrative embodiments, non-legacy header 512 may be configured to indicate MCSs to be applied to the plurality of SSs.

In some demonstrative embodiments, non-legacy header 512 may indicate a MCS value 591 corresponding to an MCS to be applied to A-MPDU 571, a MCS value 592 corresponding to an MCS to be applied to A-MPDU 574, a MCS value 593 corresponding to an MCS to be applied to A-MPDU 577, and/or a MCS value 594 corresponding to an MCS to be applied to A-MPDU 578.

In some demonstrative embodiments, including the modulation signaling information 560 in non-legacy header 510, and/or signaling the MCS values 591, 592, 593 and/or 594 of the SSs 580, 582, 584 and/or 586, respectively, in non-legacy header 512, may allow, for example, a receiving device, e.g., each receiving device, to detect and/or determine a modulation scheme, e.g., OFDM or SC or any other modulation scheme applied to one or more SS addressed to the receiver device, for example, prior to actual receipt of the one or more SSs later in the frame. This modulation signaling information 560 may allow the receiving device to use a proper decoding chain to demodulate the A-MPDU.

Figure 6:
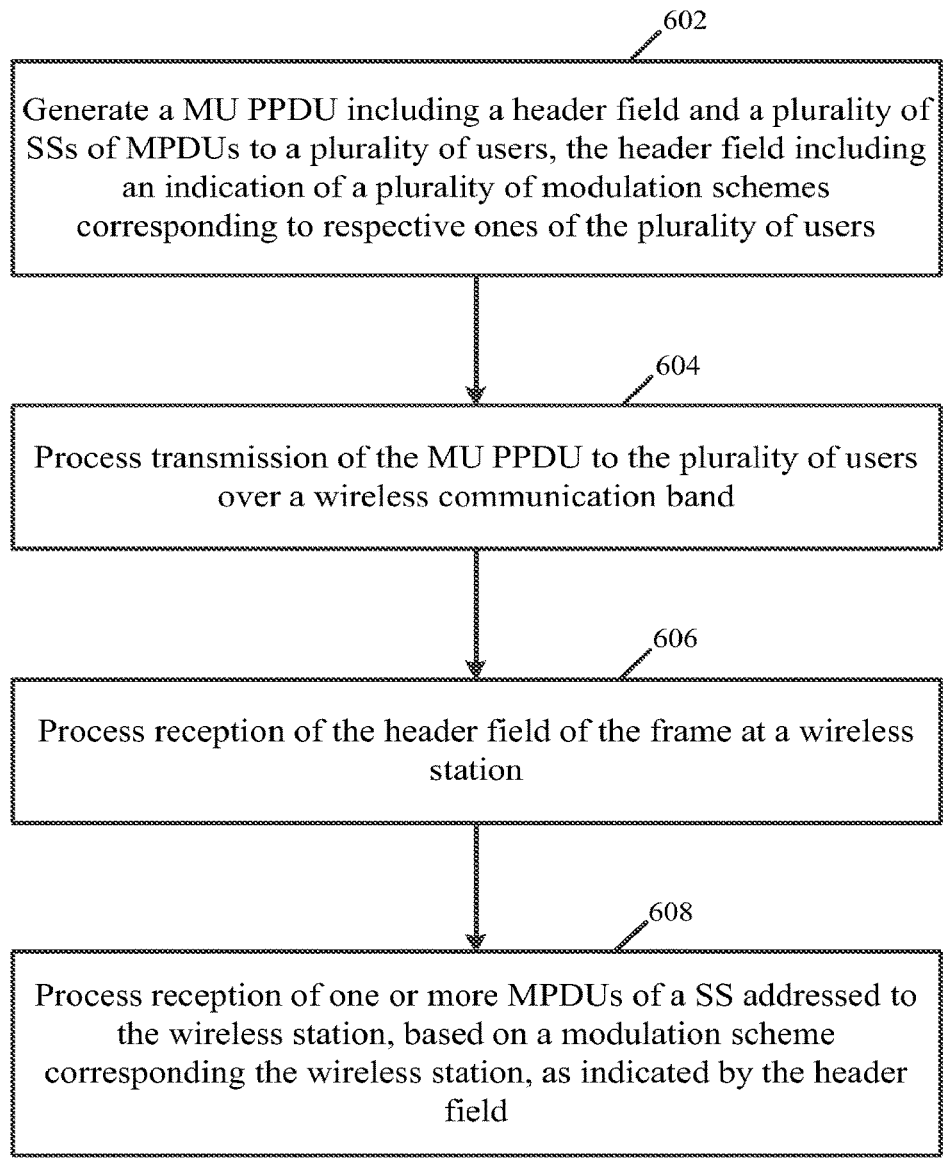
FIG. 6 is a schematic flow-chart illustration of a method of multi-user wireless communication, in accordance with some demonstrative embodiments.

Reference is made to FIG. 6, which schematically illustrates a method of MU wireless communication, in accordance with some demonstrative embodiments. For example, one or more of the operations of the method of FIG. 6 may be performed by one or more elements of a system, e.g., system 100 (FIG. 1), for example, one or more wireless devices, e.g., device 102 (FIG. 1), device 115 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 602, the method may include generating a MU PPDU including a header field and a plurality of SSs of MPDUs to a plurality of users, the header field including an indication of a plurality of modulation schemes corresponding to respective ones of the plurality of users. In one example, controller 124 (FIG. 1) may cause message processor 128 (FIG. 1) to generate PPDU 400 (FIG. 4) including header field 406 (FIG. 4), which may include modulation indication 460 (FIG. 4), and data field 414 (FIG. 4), which may include the plurality of SSs, e.g., as described above. In another example, controller 124 (FIG. 1) may cause message processor 128 (FIG. 1) to generate MU PPDU 500 (FIG. 5) including header field 506 (FIG. 5), which may include modulation indication 560 (FIG. 5), and SSs 580, 582, 584 and/or 586 (FIG. 5), e.g., as described above.

As indicated at block 604, the method may include processing transmission of the MU PPDU to the plurality of users over a wireless communication band. For example, controller 124 (FIG. 1) may cause message processor 128 (FIG. 1) and/or radio 114 (FIG. 1) to process transmission of PPDU 400 (FIG. 4) to the plurality of users, e.g., including devices 115 and/or 140 (FIG. 1), via a wireless communication band, for example, a DMG band, e.g., as described above. In another example, controller 124 (FIG. 1) may cause message processor 128 (FIG. 1) and/or radio 114 (FIG. 1) to process transmission of MU PPDU 500 (FIG. 5) to the N users, via a wireless communication band, for example, a DMG band, e.g., as described above.

As indicated at block 606, the method may include processing reception of the header field of the frame at a wireless station. For example, controller 154 (FIG. 1) may cause message processor 158 (FIG. 1) and/or radio 144 (FIG. 1) to process reception of the header field 406 (FIG. 4) of the PPDU 400 (FIG. 4), e.g., as described above. In another example, controller 154 (FIG. 1) may cause message processor 158 (FIG. 1) and/or radio 144 (FIG. 1) to process reception of the header field 506 (FIG. 5) of the MU PPDU 500 (FIG. 5), e.g., as described above.

As indicated at block 608 the method may include processing reception of one or more MPDUs of a SS addressed to the wireless station, based on a modulation scheme corresponding the wireless station, as indicated by the header field. For example, controller 154 (FIG. 1) may cause message processor 158 (FIG. 1) and/or radio 144 (FIG. 1) to process reception of a SS addressed to the STA implemented by device 140 (FIG. 1), e.g., SS 580, 582, 584 or 586 (FIG. 5), for example, based at least on a modulation scheme indicated by modulation information 560 (FIG. 5), e.g., as described above.

Figure 7:
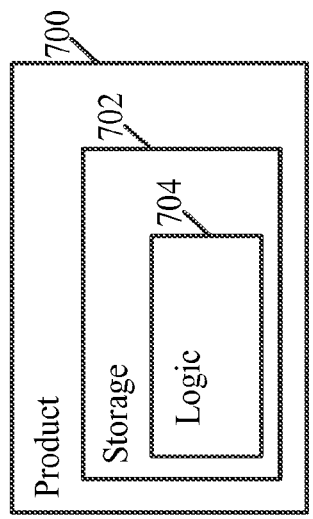
FIG. 7 is a schematic illustration of a product of manufacture, in accordance with some demonstrative embodiments.

Reference is made to FIG. 7, which schematically illustrates a product of manufacture 700, in accordance with some demonstrative embodiments. Product 700 may include a non-transitory machine-readable storage medium 702 to store logic 704, which may be used, for example, to perform at least part of the functionality of devices 102, 115, and/or 140 (FIG. 1), transmitters 118 and/or 148 (FIG. 1), receivers 116 and/or 146 (FIG. 1), controllers 124 and/or 154 (FIG. 1), message processors 128 (FIG. 1) and/or 158 (FIG. 1), and/or to perform one or more operations and/or functionalities, for example, one or more operations of the method of FIG. 6. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry configured to cause a wireless station to generate a Multi-User (MU) Physical Layer Convergence Protocol (PLCP) Protocol Data Unit (PPDU) comprising a header field and a plurality of Spatial Streams (SSs) of Media Access Control (MAC) Protocol Data Units (MPDUs) to a plurality of users, the header field comprising an indication of a plurality of modulation schemes corresponding to respective ones of the plurality of users; and process transmission of the MU PPDU to the plurality of users over a wireless communication band.

Example 2 includes the subject matter of Example 1, and optionally, configured to cause the wireless station to modulate one or more MPDUs of a SS to a user according to a modulation scheme indicated by the header field with respect to the user.

Example 3 includes the subject matter of Example 1 or 2, and optionally, wherein the MU PPDU comprises a legacy header field followed by at least one non-legacy header field, the non-legacy header field comprising the indication of the plurality of modulation schemes.

Example 4 includes the subject matter of Example 3, and optionally, wherein the MU PPDU comprises a first non-legacy header field comprising the indication of the plurality of modulation schemes, the first non-legacy header field followed by a second non-legacy header field indicating a plurality of Modulation and Coding Schemes (MCS).

Example 5 includes the subject matter of Example 4, and optionally, configured to cause the wireless station to modulate and encode one or more MPDUs of a SS to a user according to a MCS indicated by the second non-legacy header with respect to the user.

Example 6 includes the subject matter of any one of Examples 1-5, and optionally, wherein the header field comprises a modulation bitmap field comprising a sequence of a plurality of bits representing respective ones of the plurality of modulation schemes.

Example 7 includes the subject matter of Example 6, and optionally, wherein a bit of the plurality of bits has a first value or a second value, the first value to indicate a Single Carrier (SC) modulation scheme, and the second value to indicate an Orthogonal Frequency-Division Multiplexing (OFDM) modulation scheme.

Example 8 includes the subject matter of any one of Examples 1-7, and optionally, configured to cause the wireless station to process transmission of at least one SS of the plurality of SSs over a bonded channel comprising at least two channels.

Example 9 includes the subject matter of Example 8, and optionally, wherein the bonded channel comprises a 4.32 Gigahertz (GHz) channel comprising two 2.16 GHz channels.

Example 10 includes the subject matter of Example 8, and optionally, wherein the bonded channel comprises a 6.48 Gigahertz (GHz) channel comprising three 2.16 GHz channels.

Example 11 includes the subject matter of any one of Examples 8-10, and optionally, configured to cause the wireless station to process transmission of the header field over a non-bonded channel comprising one of the at least two channels.

Example 12 includes the subject matter of any one of Examples 1-11, and optionally, wherein a modulation scheme of the plurality of modulation schemes comprises a Single Carrier (SC) modulation scheme or an Orthogonal Frequency-Division Multiplexing (OFDM) modulation scheme.

Example 13 includes the subject matter of any one of Examples 1-12, and optionally, wherein the wireless communication band is a Directional Multi-Gigabit (DMG) band.

Example 14 includes the subject matter of any one of Examples 1-13, and optionally, wherein the wireless station is a Directional Multi-Gigabit (DMG) Station (STA).

Example 15 includes the subject matter of any one of Examples 1-14, and optionally, comprising one or more directional antennas, a memory, and a processor.

Example 16 includes an apparatus comprising circuitry configured to cause a wireless station to process reception of a header field of a Multi-User (MU) Physical Layer Convergence Protocol (PLCP) Protocol Data Unit (PPDU) comprising a plurality of Spatial Streams (SSs) of Media Access Control (MAC) Protocol Data Units (MPDUs) to a plurality of users, the header field comprising an indication of a plurality of modulation schemes corresponding to respective ones of the plurality of users; and process reception of one or more MPDUs of a SS addressed to the wireless station, based on a modulation scheme corresponding the wireless station, as indicated by the header field.

Example 17 includes the subject matter of Example 16, and optionally, wherein the MU PPDU comprises a legacy header field followed by at least one non-legacy header field, the non-legacy header field comprising the indication of the plurality of modulation schemes.

Example 18 includes the subject matter of Example 17, and optionally, wherein the MU PPDU comprises a first non-legacy header field comprising the indication of the plurality of modulation schemes, the first non-legacy header field followed by a second non-legacy header field indicating a plurality of Modulation and Coding Schemes (MCS).

Example 19 includes the subject matter of Example 18, and optionally, configured to cause the wireless station to demodulate and decode one or more MPDUs of the SS addressed to the wireless station according to a MCS indicated by the second non-legacy header with respect to the wireless station.

Example 20 includes the subject matter of any one of Examples 16-19, and optionally, wherein the header field comprises a modulation bitmap field comprising a sequence of a plurality of bits representing respective ones of the plurality of modulation schemes.

Example 21 includes the subject matter of Example 20, and optionally, wherein a bit of the plurality of bits has a first value or a second value, the first value to indicate a Single Carrier (SC) modulation scheme, and the second value to indicate an Orthogonal Frequency-Division Multiplexing (OFDM) modulation scheme.

Example 22 includes the subject matter of any one of Examples 16-21, and optionally, configured to cause the wireless station to process reception of one or more MPDUs of the SS addressed to the wireless station over a bonded channel comprising at least two channels.

Example 23 includes the subject matter of Example 22, and optionally, wherein the bonded channel comprises a 4.32 Gigahertz (GHz) channel comprising two 2.16 GHz channels.

Example 24 includes the subject matter of Example 22, and optionally, wherein the bonded channel comprises a 6.48 Gigahertz (GHz) channel comprising three 2.16 GHz channels.

Example 25 includes the subject matter of any one of Examples 22-24, and optionally, configured to cause the wireless station to process reception of the header field over a non-bonded channel comprising one of the at least two channels.

Example 26 includes the subject matter of any one of Examples 16-25, and optionally, wherein a modulation scheme of the plurality of modulation schemes comprises a Single Carrier (SC) modulation scheme or an Orthogonal Frequency-Division Multiplexing (OFDM) modulation scheme.

Example 27 includes the subject matter of any one of Examples 16-26, and optionally, wherein the wireless communication band is a Directional Multi-Gigabit (DMG) band.

Example 28 includes the subject matter of any one of Examples 16-27, and optionally, wherein the wireless station is a Directional Multi-Gigabit (DMG) Station (STA).

Example 29 includes the subject matter of any one of Examples 16-28, and optionally, comprising one or more directional antennas, a memory, and a processor.

Example 30 includes a method to be performed at a wireless station, the method comprising generating a Multi-User (MU) Physical Layer Convergence Protocol (PLCP) Protocol Data Unit (PPDU) comprising a header field and a plurality of Spatial Streams (SSs) of Media Access Control (MAC) Protocol Data Units (MPDUs) to a plurality of users, the header field comprising an indication of a plurality of modulation schemes corresponding to respective ones of the plurality of users; and transmitting the MU PPDU to the plurality of users over a wireless communication band.

Example 31 includes the subject matter of Example 30, and optionally, comprising modulating one or more MPDUs of a SS to a user according to a modulation scheme indicated by the header field with respect to the user.

Example 32 includes the subject matter of Example 30 or 31, and optionally, wherein the MU PPDU comprises a legacy header field followed by at least one non-legacy header field, the non-legacy header field comprising the indication of the plurality of modulation schemes.

Example 33 includes the subject matter of Example 32, and optionally, wherein the MU PPDU comprises a first non-legacy header field comprising the indication of the plurality of modulation schemes, the first non-legacy header field followed by a second non-legacy header field indicating a plurality of Modulation and Coding Schemes (MCS).

Example 34 includes the subject matter of Example 33, and optionally, comprising modulating and encoding one or more MPDUs of a SS to a user according to a MCS indicated by the second non-legacy header with respect to the user.

Example 35 includes the subject matter of any one of Examples 30-34, and optionally, wherein the header field comprises a modulation bitmap field comprising a sequence of a plurality of bits representing respective ones of the plurality of modulation schemes.

Example 36 includes the subject matter of Example 35, and optionally, wherein a bit of the plurality of bits has a first value or a second value, the first value to indicate a Single Carrier (SC) modulation scheme, and the second value to indicate an Orthogonal Frequency-Division Multiplexing (OFDM) modulation scheme.

Example 37 includes the subject matter of any one of Examples 30-36, and optionally, comprising processing transmission of at least one SS of the plurality of SSs over a bonded channel comprising at least two channels.

Example 38 includes the subject matter of Example 37, and optionally, wherein the bonded channel comprises a 4.32 Gigahertz (GHz) channel comprising two 2.16 GHz channels.

Example 39 includes the subject matter of Example 37, and optionally, wherein the bonded channel comprises a 6.48 Gigahertz (GHz) channel comprising three 2.16 GHz channels.

Example 40 includes the subject matter of any one of Examples 37-39, and optionally, comprising processing transmission of the header field over a non-bonded channel comprising one of the at least two channels.

Example 41 includes the subject matter of any one of Examples 30-40, and optionally, wherein a modulation scheme of the plurality of modulation schemes comprises a Single Carrier (SC) modulation scheme or an Orthogonal Frequency-Division Multiplexing (OFDM) modulation scheme.

Example 42 includes the subject matter of any one of Examples 30-41, and optionally, wherein the wireless communication band is a Directional Multi-Gigabit (DMG) band.

Example 43 includes the subject matter of any one of Examples 30-42, and optionally, wherein the wireless station is a Directional Multi-Gigabit (DMG) Station (STA).

Example 44 includes a product comprising one or more tangible computer-readable non-transitory storage media comprising computer-executable instructions operable to, when executed by at least one computer processor, enable the at least one computer processor to implement one or more operations at a wireless station, the operations comprising generating a Multi-User (MU) Physical Layer Convergence Protocol (PLCP) Protocol Data Unit (PPDU) comprising a header field and a plurality of Spatial Streams (SSs) of Media Access Control (MAC) Protocol Data Units (MPDUs) to a plurality of users, the header field comprising an indication of a plurality of modulation schemes corresponding to respective ones of the plurality of users; and transmitting the MU PPDU to the plurality of users over a wireless communication band.

Example 45 includes the subject matter of Example 44, and optionally, wherein the operations comprise modulating one or more MPDUs of a SS to a user according to a modulation scheme indicated by the header field with respect to the user.

Example 46 includes the subject matter of Example 44 or 45, and optionally, wherein the MU PPDU comprises a legacy header field followed by at least one non-legacy header field, the non-legacy header field comprising the indication of the plurality of modulation schemes.

Example 47 includes the subject matter of Example 46, and optionally, wherein the MU PPDU comprises a first non-legacy header field comprising the indication of the plurality of modulation schemes, the first non-legacy header field followed by a second non-legacy header field indicating a plurality of Modulation and Coding Schemes (MCS).

Example 48 includes the subject matter of Example 47, and optionally, wherein the operations comprise modulating and encoding one or more MPDUs of a SS to a user according to a MCS indicated by the second non-legacy header with respect to the user.

Example 49 includes the subject matter of any one of Examples 44-48, and optionally, wherein the header field comprises a modulation bitmap field comprising a sequence of a plurality of bits representing respective ones of the plurality of modulation schemes.

Example 50 includes the subject matter of Example 49, and optionally, wherein a bit of the plurality of bits has a first value or a second value, the first value to indicate a Single Carrier (SC) modulation scheme, and the second value to indicate an Orthogonal Frequency-Division Multiplexing (OFDM) modulation scheme.

Example 51 includes the subject matter of any one of Examples 44-50, and optionally, wherein the operations comprise processing transmission of at least one SS of the plurality of SSs over a bonded channel comprising at least two channels.

Example 52 includes the subject matter of Example 51, and optionally, wherein the bonded channel comprises a 4.32 Gigahertz (GHz) channel comprising two 2.16 GHz channels.

Example 53 includes the subject matter of Example 51, and optionally, wherein the bonded channel comprises a 6.48 Gigahertz (GHz) channel comprising three 2.16 GHz channels.

Example 54 includes the subject matter of any one of Examples 51-53, and optionally, wherein the operations comprise processing transmission of the header field over a non-bonded channel comprising one of the at least two channels.

Example 55 includes the subject matter of any one of Examples 44-54, and optionally, wherein a modulation scheme of the plurality of modulation schemes comprises a Single Carrier (SC) modulation scheme or an Orthogonal Frequency-Division Multiplexing (OFDM) modulation scheme.

Example 56 includes the subject matter of any one of Examples 44-55, and optionally, wherein the wireless communication band is a Directional Multi-Gigabit (DMG) band.

Example 57 includes the subject matter of any one of Examples 44-56, and optionally, wherein the wireless station is a Directional Multi-Gigabit (DMG) Station (STA).

Example 58 includes an apparatus of wireless communication by a wireless station, the apparatus comprising means for generating a Multi-User (MU) Physical Layer Convergence Protocol (PLCP) Protocol Data Unit (PPDU) comprising a header field and a plurality of Spatial Streams (SSs) of Media Access Control (MAC) Protocol Data Units (MPDUs) to a plurality of users, the header field comprising an indication of a plurality of modulation schemes corresponding to respective ones of the plurality of users; and means for processing transmission of the MU PPDU to the plurality of users over a wireless communication band.

Example 59 includes the subject matter of Example 58, and optionally, comprising means for modulating one or more MPDUs of a SS to a user according to a modulation scheme indicated by the header field with respect to the user.

Example 60 includes the subject matter of Example 58 or 59, and optionally, wherein the MU PPDU comprises a legacy header field followed by at least one non-legacy header field, the non-legacy header field comprising the indication of the plurality of modulation schemes.

Example 61 includes the subject matter of Example 60, and optionally, wherein the MU PPDU comprises a first non-legacy header field comprising the indication of the plurality of modulation schemes, the first non-legacy header field followed by a second non-legacy header field indicating a plurality of Modulation and Coding Schemes (MCS).

Example 62 includes the subject matter of Example 61, and optionally, comprising means for modulating and encoding one or more MPDUs of a SS to a user according to a MCS indicated by the second non-legacy header with respect to the user.

Example 63 includes the subject matter of any one of Examples 58-62, and optionally, wherein the header field comprises a modulation bitmap field comprising a sequence of a plurality of bits representing respective ones of the plurality of modulation schemes.

Example 64 includes the subject matter of Example 63, and optionally, wherein a bit of the plurality of bits has a first value or a second value, the first value to indicate a Single Carrier (SC) modulation scheme, and the second value to indicate an Orthogonal Frequency-Division Multiplexing (OFDM) modulation scheme.

Example 65 includes the subject matter of any one of Examples 58-64, and optionally, comprising means for processing transmission of at least one SS of the plurality of SSs over a bonded channel comprising at least two channels.

Example 66 includes the subject matter of Example 65, and optionally, wherein the bonded channel comprises a 4.32 Gigahertz (GHz) channel comprising two 2.16 GHz channels.

Example 67 includes the subject matter of Example 65, and optionally, wherein the bonded channel comprises a 6.48 Gigahertz (GHz) channel comprising three 2.16 GHz channels.

Example 68 includes the subject matter of any one of Examples 65-67, and optionally, comprising means for processing transmission of the header field over a non-bonded channel comprising one of the at least two channels.

Example 69 includes the subject matter of any one of Examples 58-68, and optionally, wherein a modulation scheme of the plurality of modulation schemes comprises a Single Carrier (SC) modulation scheme or an Orthogonal Frequency-Division Multiplexing (OFDM) modulation scheme.

Example 70 includes the subject matter of any one of Examples 58-69, and optionally, wherein the wireless communication band is a Directional Multi-Gigabit (DMG) band.

Example 71 includes the subject matter of any one of Examples 58-70, and optionally, wherein the wireless station is a Directional Multi-Gigabit (DMG) Station (STA).

Example 72 includes a method to be performed at a wireless station, the method comprising processing reception of a header field of a Multi-User (MU) Physical Layer Convergence Protocol (PLCP) Protocol Data Unit (PPDU) comprising a plurality of Spatial Streams (SSs) of Media Access Control (MAC) Protocol Data Units (MPDUs) to a plurality of users, the header field comprising an indication of a plurality of modulation schemes corresponding to respective ones of the plurality of users; and processing reception of one or more MPDUs of a SS addressed to the wireless station, based on a modulation scheme corresponding the wireless station, as indicated by the header field.

Example 73 includes the subject matter of Example 72, and optionally, wherein the MU PPDU comprises a legacy header field followed by at least one non-legacy header field, the non-legacy header field comprising the indication of the plurality of modulation schemes.

Example 74 includes the subject matter of Example 73, and optionally, wherein the MU PPDU comprises a first non-legacy header field comprising the indication of the plurality of modulation schemes, the first non-legacy header field followed by a second non-legacy header field indicating a plurality of Modulation and Coding Schemes (MCS).

Example 75 includes the subject matter of Example 74, and optionally, comprising demodulating and decoding one or more MPDUs of the SS addressed to the wireless station according to a MCS indicated by the second non-legacy header with respect to the wireless station.

Example 76 includes the subject matter of any one of Examples 72-75, and optionally, wherein the header field comprises a modulation bitmap field comprising a sequence of a plurality of bits representing respective ones of the plurality of modulation schemes.

Example 77 includes the subject matter of Example 76, and optionally, wherein a bit of the plurality of bits has a first value or a second value, the first value to indicate a Single Carrier (SC) modulation scheme, and the second value to indicate an Orthogonal Frequency-Division Multiplexing (OFDM) modulation scheme.

Example 78 includes the subject matter of any one of Examples 72-77, and optionally, comprising processing reception of one or more MPDUs of the SS addressed to the wireless station over a bonded channel comprising at least two channels.

Example 79 includes the subject matter of Example 78, and optionally, wherein the bonded channel comprises a 4.32 Gigahertz (GHz) channel comprising two 2.16 GHz channels.

Example 80 includes the subject matter of Example 78, and optionally, wherein the bonded channel comprises a 6.48 Gigahertz (GHz) channel comprising three 2.16 GHz channels.

Example 81 includes the subject matter of any one of Examples 78-80, and optionally, comprising processing reception of the header field over a non-bonded channel comprising one of the at least two channels.

Example 82 includes the subject matter of any one of Examples 72-81, and optionally, wherein a modulation scheme of the plurality of modulation schemes comprises a Single Carrier (SC) modulation scheme or an Orthogonal Frequency-Division Multiplexing (OFDM) modulation scheme.

Example 83 includes the subject matter of any one of Examples 72-82, and optionally, wherein the wireless communication band is a Directional Multi-Gigabit (DMG) band.

Example 84 includes the subject matter of any one of Examples 72-83, and optionally, wherein the wireless station is a Directional Multi-Gigabit (DMG) Station (STA).

Example 85 includes a product comprising one or more tangible computer-readable non-transitory storage media comprising computer-executable instructions operable to, when executed by at least one computer processor, enable the at least one computer processor to implement one or more operations at a wireless station, the operations comprising processing reception of a header field of a Multi-User (MU) Physical Layer Convergence Protocol (PLCP) Protocol Data Unit (PPDU) comprising a plurality of Spatial Streams (SSs) of Media Access Control (MAC) Protocol Data Units (MPDUs) to a plurality of users, the header field comprising an indication of a plurality of modulation schemes corresponding to respective ones of the plurality of users; and processing reception of one or more MPDUs of a SS addressed to the wireless station, based on a modulation scheme corresponding the wireless station, as indicated by the header field.

Example 86 includes the subject matter of Example 85, and optionally, wherein the MU PPDU comprises a legacy header field followed by at least one non-legacy header field, the non-legacy header field comprising the indication of the plurality of modulation schemes.

Example 87 includes the subject matter of Example 86, and optionally, wherein the MU PPDU comprises a first non-legacy header field comprising the indication of the plurality of modulation schemes, the first non-legacy header field followed by a second non-legacy header field indicating a plurality of Modulation and Coding Schemes (MCS).

Example 88 includes the subject matter of Example 87, and optionally, wherein the operations comprise demodulating and decoding one or more MPDUs of the SS addressed to the wireless station according to a MCS indicated by the second non-legacy header with respect to the wireless station.

Example 89 includes the subject matter of any one of Examples 85-88, and optionally, wherein the header field comprises a modulation bitmap field comprising a sequence of a plurality of bits representing respective ones of the plurality of modulation schemes.

Example 90 includes the subject matter of Example 89, and optionally, wherein a bit of the plurality of bits has a first value or a second value, the first value to indicate a Single Carrier (SC) modulation scheme, and the second value to indicate an Orthogonal Frequency-Division Multiplexing (OFDM) modulation scheme.

Example 91 includes the subject matter of any one of Examples 85-90, and optionally, wherein the operations comprise processing reception of one or more MPDUs of the SS addressed to the wireless station over a bonded channel comprising at least two channels.

Example 92 includes the subject matter of Example 91, and optionally, wherein the bonded channel comprises a 4.32 Gigahertz (GHz) channel comprising two 2.16 GHz channels.

Example 93 includes the subject matter of Example 91, and optionally, wherein the bonded channel comprises a 6.48 Gigahertz (GHz) channel comprising three 2.16 GHz channels.

Example 94 includes the subject matter of any one of Examples 91-93, and optionally, wherein the operations comprise processing reception of the header field over a non-bonded channel comprising one of the at least two channels.

Example 95 includes the subject matter of any one of Examples 85-94, and optionally, wherein a modulation scheme of the plurality of modulation schemes comprises a Single Carrier (SC) modulation scheme or an Orthogonal Frequency-Division Multiplexing (OFDM) modulation scheme.

Example 96 includes the subject matter of any one of Examples 85-95, and optionally, wherein the wireless communication band is a Directional Multi-Gigabit (DMG) band.

Example 97 includes the subject matter of any one of Examples 85-96, and optionally, wherein the wireless station is a Directional Multi-Gigabit (DMG) Station (STA).

Example 98 includes an apparatus of wireless communication by a wireless station, the apparatus comprising means for processing reception of a header field of a Multi-User (MU) Physical Layer Convergence Protocol (PLCP) Protocol Data Unit (PPDU) comprising a plurality of Spatial Streams (SSs) of Media Access Control (MAC) Protocol Data Units (MPDUs) to a plurality of users, the header field comprising an indication of a plurality of modulation schemes corresponding to respective ones of the plurality of users; and means for processing reception of one or more MPDUs of a SS addressed to the wireless station, based on a modulation scheme corresponding the wireless station, as indicated by the header field.

Example 99 includes the subject matter of Example 98, and optionally, wherein the MU PPDU comprises a legacy header field followed by at least one non-legacy header field, the non-legacy header field comprising the indication of the plurality of modulation schemes.

Example 100 includes the subject matter of Example 99, and optionally, wherein the MU PPDU comprises a first non-legacy header field comprising the indication of the plurality of modulation schemes, the first non-legacy header field followed by a second non-legacy header field indicating a plurality of Modulation and Coding Schemes (MCS).

Example 101 includes the subject matter of Example 100, and optionally, comprising means for demodulating and decoding one or more MPDUs of the SS addressed to the wireless station according to a MCS indicated by the second non-legacy header with respect to the wireless station.

Example 102 includes the subject matter of any one of Examples 98-101, and optionally, wherein the header field comprises a modulation bitmap field comprising a sequence of a plurality of bits representing respective ones of the plurality of modulation schemes.

Example 103 includes the subject matter of Example 102, and optionally, wherein a bit of the plurality of bits has a first value or a second value, the first value to indicate a Single Carrier (SC) modulation scheme, and the second value to indicate an Orthogonal Frequency-Division Multiplexing (OFDM) modulation scheme.

Example 104 includes the subject matter of any one of Examples 98-103, and optionally, comprising means for processing reception of one or more MPDUs of the SS addressed to the wireless station over a bonded channel comprising at least two channels.

Example 105 includes the subject matter of Example 104, and optionally, wherein the bonded channel comprises a 4.32 Gigahertz (GHz) channel comprising two 2.16 GHz channels.

Example 106 includes the subject matter of Example 104, and optionally, wherein the bonded channel comprises a 6.48 Gigahertz (GHz) channel comprising three 2.16 GHz channels.

Example 107 includes the subject matter of any one of Examples 104-106, and optionally, comprising means for processing reception of the header field over a non-bonded channel comprising one of the at least two channels.

Example 108 includes the subject matter of any one of Examples 98-107, and optionally, wherein a modulation scheme of the plurality of modulation schemes comprises a Single Carrier (SC) modulation scheme or an Orthogonal Frequency-Division Multiplexing (OFDM) modulation scheme.

Example 109 includes the subject matter of any one of Examples 98-108, and optionally, wherein the wireless communication band is a Directional Multi-Gigabit (DMG) band.

Example 110 includes the subject matter of any one of Examples 98-109, and optionally, wherein the wireless station is a Directional Multi-Gigabit (DMG) Station (STA).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising memory circuitry, and one or more processors, the one or more processors to:
   process an Extended Directional Multigigabit (EDMG) Multi-User (MU) Physical Layer Convergence Protocol Data Unit (PPDU) for a MU transmission, the PPDU comprising a header portion and a data portion, the data portion including a plurality of Media Access Control (MAC) Protocol Data Units (MPDUs) in a plurality of Spatial Streams (SSs) and addressed to a plurality of wireless stations (STAB), wherein:
   the header portion indicates a modulation scheme for the MU transmission, the modulation scheme including a Single Carrier (SC) modulation scheme or an Orthogonal Frequency Division Multiplexing (OFDM) modulation scheme;
   the header portion includes a legacy header, and a non-legacy header following the legacy header, the non-legacy header including a first non-legacy header EDMG-Header A, and a second non-legacy header EDMG-Header B, the EDMG-Header B indicating a plurality of Modulation and Coding Schemes (MCSs) on a per SS basis;
   determine from the header portion whether the modulation scheme for the MU transmission is a SC modulation or an OFDM modulation;
   use a decoding chain based on the modulation scheme to demodulate the MU transmission; and
   demodulate the SSs according to the MCSs.

2. The apparatus of claim 1, wherein the header portion comprises a sequence of bits, and wherein a bit of the sequence of bits is to have a first value to indicate the SC modulation scheme, and a second value to indicate the OFDM modulation scheme.

3. The apparatus of claim 1, wherein the wireless communication band includes a bonded channel including a 4.32 GHz channel consisting of two 2.16 GHz channels.

4. The apparatus of claim 1, wherein the wireless communication band includes a bonded channel including a 6.48 GHz channel consisting of three 2.16 GHz channels.

5. The apparatus of claim 1, wherein the non-legacy header includes MU-MIMO parameters including information relating to a number of SSs and wherein the one or more processors are to decode the non-legacy header to determine the number of SSs.

6. The apparatus of claim 1, further including a processor, a radio and one or more directional antennas.

7. A product comprising one or more tangible computer-readable non-transitory storage media comprising computer-executable instructions operable to, when executed by at least one computer processor, cause a wireless station to:
   process an Extended Directional Multigigabit (EDMG) Multi-User (MU) Physical Layer Convergence Protocol Data Unit (PPDU) for a MU transmission, the PPDU comprising a header portion and a data portion, the data portion including a plurality of Media Access Control (MAC) Protocol Data Units (MPDUs) in a plurality of Spatial Streams (SSs) and addressed to a plurality of wireless stations (STAB), wherein:

the header portion indicates a modulation scheme for the MU transmission, the modulation scheme including a Single Carrier (SC) modulation scheme or an Orthogonal Frequency Division Multiplexing (OFDM) modulation scheme;

the header portion includes a legacy header, and a non-legacy header following the legacy header, the non-legacy header including a first non-legacy header EDMG-Header A, and a second non-legacy header EDMG-Header B, the EDMG-Header B indicating a plurality of Modulation and Coding Schemes (MCSs) on a per SS basis;

determine from the header portion whether the modulation scheme for the MU transmission is a SC modulation or an OFDM modulation;

use a decoding chain based on the modulation scheme to demodulate the MU transmission; and demodulate the SSs according to the MCSs.

8. The product of claim 7, wherein the header portion comprises a sequence of bits, and wherein a bit of the sequence of bits is to have a first value to indicate the SC modulation scheme, and a second value to indicate the OFDM modulation scheme.

9. The product of claim 7, wherein the wireless communication band includes a bonded channel including a 4.32 GHz channel consisting of two 2.16 GHz channels.

10. The product of claim 7, wherein the wireless communication band includes a bonded channel including a 6.48 GHz channel consisting of three 2.16 GHz channels.

11. The product of claim 7, wherein the non-legacy header includes MU-MIMO parameters including information relating to a number of SSs and wherein the operations are further operable to decode the non-legacy header to determine the number of SSs.

12. A method to be performed at a wireless device including:

processing an Extended Directional Multigigabit (EDMG) Multi-User (MU) Physical Layer Convergence Protocol Data Unit (PPDU) for a MU transmission, the PPDU comprising a header portion and a data portion, the data portion including a plurality of Media Access Control (MAC) Protocol Data Units (MPDUs) in a plurality of Spatial Streams (SSs) and addressed to a plurality of wireless stations (STAB), wherein:

the header portion indicates a modulation scheme for the MU transmission, the modulation scheme including a Single Carrier (SC) modulation scheme or an Orthogonal Frequency Division Multiplexing (OFDM) modulation scheme;

the header portion includes a legacy header, and a non-legacy header following the legacy header, the non-legacy header including a first non-legacy header EDMG-Header A, and a second non-legacy header EDMG-Header B, the EDMG-Header B indicating a plurality of Modulation and Coding Schemes (MCSs) on a per SS basis;

determining from the header portion whether the modulation scheme for the MU transmission is a SC modulation or an OFDM modulation;

using a decoding chain based on the modulation scheme to demodulate the MU transmission; and demodulating the SSs according to the MCSs.

13. The method of claim 12, wherein the header portion comprises a sequence of bits, and wherein a bit of the sequence of bits is to have a first value to indicate the SC modulation scheme, and a second value to indicate the OFDM modulation scheme.

14. The method of claim 12, wherein the wireless communication band includes a bonded channel including a 4.32 GHz channel consisting of two 2.16 GHz channels.

15. The method of claim 12, wherein the wireless communication band includes a bonded channel including a 6.48 GHz channel consisting of three 2.16 GHz channels.

16. The method of claim 12, wherein the non-legacy header includes MU-MIMO parameters including information relating to a number of SSs and wherein the method further includes decoding the non-legacy header to determine the number of SSs.

* * * * *